United States Patent [19]
Young et al.

[11] Patent Number: 6,048,564
[45] Date of Patent: Apr. 11, 2000

[54] BAKERY SHORTENING SUBSTITUTE, BAKERY PRODUCTS CONTAINING THE SAME, AND PREPARATION METHOD

[75] Inventors: Timothy J. Young, Tenafly, N.J.; Guy A. Crosby, Weston, Mass.

[73] Assignee: FMC Corporation, Philadelphia, Pa.

[21] Appl. No.: 09/088,253

[22] Filed: Jun. 1, 1998

Related U.S. Application Data

[63] Continuation-in-part of application No. 08/545,414, Oct. 19, 1995, abandoned.

[51] Int. Cl.[7] .................................................. A23L 1/0528
[52] U.S. Cl. .......................... 426/573; 426/575; 426/577; 426/601; 426/602; 426/603; 426/604; 426/606
[58] Field of Search ..................................... 426/573, 575, 426/577, 578, 601, 602, 603, 604, 606

[56] References Cited

U.S. PATENT DOCUMENTS

| | | | |
|---|---|---|---|
| 4,427,704 | 1/1984 | Cheney et al. | 426/104 |
| 4,582,714 | 4/1986 | Ford et al. | 426/564 |
| 4,676,976 | 6/1987 | Toba et al. | 424/485 |
| 4,746,528 | 5/1988 | Prest et al. | 426/573 |
| 4,894,250 | 1/1990 | Musson et al. | 426/573 |
| 5,178,897 | 1/1993 | Tanaka et al. | 426/602 |
| 5,324,531 | 6/1994 | Hoefler et al. | 426/573 |
| 5,332,595 | 7/1994 | Gaonkar | 426/602 |
| 5,338,561 | 8/1994 | Campbell et al. | 426/602 |
| 5,360,627 | 11/1994 | Desai et al. | 426/606 |
| 5,462,761 | 10/1995 | McGinley et al. | 426/573 |

OTHER PUBLICATIONS

Mc Wand, "The Low–Fat Challenge" in Baking & Snack, Aug. 1993, pp. 37–42.

Knightly "Surfactant in Baked Foods; Current Practice and Future Trends", Cereal Food World, 33: 405–412 (1988).

*Primary Examiner*—Lien Tran
*Attorney, Agent, or Firm*—FMC Corporation

[57] ABSTRACT

An emulsion composition useful as a reduced-fat shortening substitute in bakery applications which comprises an emulsion with an aqueous phase containing water and konjac as a gelling agent and a lipid phase containing a lipid component and an emulsifier component. The konjac is preferably partially deacylated to provide controlled melt characteristics in the emulsion composition that replicate those of the full-fat shortening it replaces in bakery food products. A process for preparing the emulsion compositions is also disclosed. Bakery food products containing the emulsion compositions may be prepared using the emulsion compositions as a one-to-one replacement for full-fat shortening in the formulations. The reduced-fat bakery products made with the emulsion compositions exhibit sensory characteristics similar to those of the full-fat equivalents.

40 Claims, No Drawings

BAKERY SHORTENING SUBSTITUTE, BAKERY PRODUCTS CONTAINING THE SAME, AND PREPARATION METHOD

This is a continuation-in-part of U.S. application Ser. No. 08/545,414 filed Oct. 19, 1995 now abandoned.

BACKGROUND OF THE INVENTION

1. Field of the Invention

This invention relates to a bakery shortening substitute that is an emulsion having a lipid phase and an aqueous phase, the aqueous phase containing a gelling agent that is konjac. This invention also relates to the emulsion preparation method and bakery products that contain the emulsion as a reduced-fat shortening substitute.

2. Background Information

A recent trend in the food industry is the introduction of reduced fat or no fat versions of many fat-containing food products, such as bakery goods. Bakery food products include cakes, cookies, pastries, breads, and the like. Baked goods are prepared from batters or doughs that contain, in addition to flour and sugar, lipids such as fats and/or oils, i.e., liquid fats, often in combination with emulsifiers. Many bakery products require a relatively large proportion of fat, e.g., introduced as shortening and/or butter or the like. Cake batter, for example, can contain 20–35 weight percent shortening.

Elimination or replacement of a portion of the fat content in bakery food products can lead to dramatic reductions in fat content, but such reduced fat levels often have adverse consequences affecting the taste, texture and volume of the baked goods.

The functions of the fat component in bakery goods are several:

provide shortened or flaky crumb structure;

provide moistness and lubricity stabilize foam (aeration) formed during baking provide firmness and clean bite reduce product stickiness during the baking process.

Satisfactory systems for replacing the fat component in baked goods must not only be functional, e.g., providing shortened crumb structure and foam stabilization, but also provide desirable sensory characteristics, e.g., moistness, tenderness, good bite, lubricity, and cohesiveness.

Reduced fat and nonfat baked goods, such as cakes, which are presently being sold typically exhibit one or more of the following undesirable attributes: dryness, gumminess (bails up in the mouth), coarse texture, or no lubricity.

Numerous fat substitutes have been described in the literature for use in replacing the oil or fat in fat-containing foods, like salad oils and dressings, mayonnaises, nondairy spreads and desserts like baked goods. An introductory overview to current techniques for reducing the fat content of baked foods is presented by McWand, "The Low-Fat Challenge" in *Baking & Snack*, August 1993, pp. 37–42.

Hydrocolloid gums have been used to reduce fat levels by allowing increased water contents in the lowered fat foods, the hydrocolloid serving to bind water. Xanthan gum is the most widely used hydrocolloid gum for this purpose, but other hydrocolloids such as carboxymethylcellulose, pectin, alginate, carrageenan, gum tragacanth and locust bean gum have been proposed for this use. Excessive use of these hydrocolloids can lead to gumminess in bakery food products; this characteristic limits the extent to which increased water levels (bound with these products) can replace the fat content of high fat bakery foods. Microcrystalline cellulose, which can serve as the functional equivalent of a hydrocolloid gum, has also been recommended as a fat replacer in reduced fat foods. The use of liquid shortenings as replacements in bakery goods for semi-solid, plastic-consistency shortenings, e.g., vegetable shortenings produced by hydrogenation of vegetable oil, is described by Knightly in "Surfactants in Baked Foods: Current Practice and Future Trends", *Cereal Food World*, 33:405–412 (1988). Semisolid, plastic-consistency shortenings continue to be a preferred choice in commercial bakery products. A need exists with lowered fat or nonfat baked goods for a shortening substitute that can replace conventional high fat shortenings, on a one-to-one basis, while still providing the processing characteristics of the high fat shortenings that it replaces.

Emulsion technology has been utilized to make lowered fat food products. U.S. Pat. No. 5,178,897 issued to Tanaka et al. describes a water-in-oil emulsion composition for baked food products, white bread being exemplified. The emulsion contains a sizing agent that may be starch, guar gum, carrageenan, alginates or pectin. U.S. Pat. No. 5,332,595 issued to Gaonkar describes water/oil/water and oil/water/oil emulsions that are useful in salad dressings, spreads, sauces, frozen desserts and the like. The emulsion contains a gel forming composition that may be a gellable polysaccharide such as alginate, carrageenan, chitosan or gellan that is present as a gelatinous layer at the internal water/oil interface. The internal aqueous phase may also contain a thickener gum such as xanthan, gum arabic, carob bean gum, gum tragacanth, guar gum or the like. U.S. Pat. No. 5,338,561 issued to Campbell et al. describes a water continuous emulsion that contains a gelling polysaccharide like guar, carrageenan, pectin, alginate, gellan and furcellaran, for use in nondairy creams, dressings and mayonnaises.

Konjac glucomannan is another hydrocolloid gel that has been mentioned in publications that describe its use as a thickener or gelling agent in various food applications.

U.S. Pat. No. 4,427,704 issued to Cheney et al. describes thermo-reversible or thermo-irreversible gels containing carrageenan and a glucomannan such as konjac, and the thermo-irreversible gels are described as useful in food products resistant to structural breakdown upon heating.

U.S. Pat. No. 4,582,714 issued to Ford et al. describes ungelled processed food product stabilized and/or thickened by at least one glucomannan, such as konjac glucomannan. Suitable food products are those with thickened and/or stabilized (but not gelled) emulsions and the examples include ice cream, whipping cream, meringues, cheese spreads, cheese slices and milk drinks.

U.S. Pat. No. 4,676,976 issued to Toba et al. describes a konjac mannan-containing reversible gel that also contains xanthan gum, useful in foodstuffs that are in a gel state at room or chilled temperatures (e.g., jelly), foodstuffs that are converted to a liquid-to-semisolid state by heating (eg., soup, meltable cheese) and foodstuffs in which solid, paste and liquid states are co-present (e.g., minced meat dumplings).

U.S. Pat. No. 4,746,528 issued to Prest et al. describes a gellable system containing gellan, xanthan gum and a galactomannan or glucomannan gum that produces a gel in combination with xanthan, especially carob, tara, cassia or konjac gum. The gelling system is described as having application to a wide variety of human or animal foods, especially in pasteurized or sterilized food products.

U.S. Pat. No. 4,894,250 issued to Musson et al. describes thermo-irreversible aqueous gels containing xanthan and a glucomannan such as konjac, useful in food products such as minced meat.

An object of the present invention is a shortening substitute that replaces conventional shortening in bakery products and that also provides the physical and sensory characteristics of conventional shortening in high fat bakery products.

SUMMARY OF THE INVENTION

This invention pertains to an emulsion composition, useful as a shortening substitute in bakery applications, that has an aqueous phase containing water and konjac as a gelling agent and a lipid phase containing a lipid component and an emulsifier component. The emulsion composition may be an oil-in-water emulsion or a water-in-oil emulsion. In preferred embodiments, konjac in the emulsion composition is partially deacylated, is present in an amount of from about 0.3 weight percent to about 5 weight percent, based on the weight of the emulsion and may be employed in combination with a hydrocolloid or hydrocolloid functional equivalent, such as microcrystalline cellulose, xanthan, sodium alginate, locust bean gum, carrageenan, guar gum or the like. In a more preferred embodiment, the konjac in the emulsion is at least 30% deacylated and is present in an amount of from about 0.3 weight percent to about 2 weight percent.

The preferred emulsion compositions of this invention have a plastic or solid consistency below a temperature of about 350° C. and exhibit controlled melt characteristics, having a melt or flow temperature above about 60° C. The lipid component of the emulsion composition is preferably present in an amount of from about 1 weight percent to about 30 weight percent, based on the weight of the emulsion. Since the emulsion compositions may be used as shortening replacements in bakery food product formulations on a one-to-one replacement (by volume) basis, they are very useful for preparing reduced fat versions of traditional full-fat bakery food products.

Another aspect of the present invention is a bakery food product containing the emulsion composition of this invention as a shortening substitute. The emulsion composition is preferably present as a shortening substitute in an amount of from about 5 weight percent to about 30 weight percent, based on the weight of the bakery product dough or batter prior to baking.

Still another aspect of this invention is a process for preparing an emulsion composition useful as a shortening substitute in bakery applications which has the steps of forming a lipid phase by combining a lipid component with an emulsifier component; forming an aqueous phase by dispersing konjac in water; combining the liquid phase with the aqueous phase under high shear mixing conditions at an elevated temperature to form an emulsion; and cooling the emulsion composition below about 35° C. The konjac is preferably deacylated in this process under alkaline pH conditions, at a pH of about 8 to about 12, such as by introduction of a weak base during the formation of the emulsion. The deacylation is preferably carried out at an elevated temperature, preferably from about 500° C. to about 950° C. In preferred embodiments of this process, the konjac is partially deacylated, to provide controlled melt characteristics in the emulsion composition that replicate those of the shortening it replaces in bakery food products.

DETAILED DESCRIPTION OF THE PREFERRED EMBODIMENTS

Emulsion compositions of this invention, useful as shortening substitutes in bakery applications, have an aqueous phase containing konjac as a gelling agent, optionally in combination with microcrystalline cellulose or a hydrocolloid gum, and a lipid phase containing one or more lipids and emulsifiers.

A preferred composition comprises a gel formed from an emulsion with an aqueous phase containing water and konjac as a gelling agent; and a lipid phase containing a lipid component and an emulsifier component, wherein the konjac is at least about 30% deacylated and is present in an amount of from about 0.3 weight percent to about 2 weight percent, based on the weight of the emulsion. Such compositions preferably exhibit controlled melting characteristics which make them well suited for use as shortening substitutes in bakery food products. The controlled melt characteristic enables the emulsion to exhibit a semi-solid, plastic consistency at or below ambient temperature, 20° C.–25° C., but to become flowable or melt at elevated temperatures encountered in food processing operations such as a baking oven.

Alternative embodiments of the emulsion compositions may be liquid at ambient temperature, making them suitable as replacements for oil in bakery food formulations. Other embodiments of these emulsions may be completely heat stable, providing uniform emulsion physical properties, i.e., resisting melting, even at elevated temperatures.

One aspect of the emulsion compositions of this invention is the presence of konjac as a gelling agent in the aqueous phase of the emulsion.

Konjac is a neutral polysaccharide with unusual gelling properties (described below), as compared with other hydrocolloid gums commonly-used for preparing aqueous gel systems. Konjac is a naturally derived material, a glucomannan that may be obtained from tubers of the plant *Amorphophallus konjac* (elephant yam). The dried plant tubers are ground and the glucomannan-containing portions are recovered as konjac powder or flour. The konjac flour typically contains about 60–80% glucomannan gum. Konjac flour that is commercially available has typically been washed, e.g., with water and/or alcohol, to remove or reduce the level of impurities and other non-glucomannan components present in the flour.

Konjac is a glucomannan polymer, a long chain (high molecular weight) polymer of glucose and mannose units with acetyl groups attached. Konjac glucomannan, also referred to in this specification as konjac, is randomly acetylated at the C-6 position of a sugar unit on the glucomannan polymer. These acetyl groups may be present as one acetyl per six to twenty sugar units.

Melt controllable or heat stable aqueous gel systems may be made with konjac by treating the konjac under alkaline pH conditions, preferably at an elevated temperature, to deacylate the polymer. The deacylation (sometimes referred to as a hydrolysis reaction) is generally carried out by treating the konjac with a weak base or alkali, optionally and preferably at an elevated temperature, e.g., 50–95° C., to enhance the rate of the deacylation reaction.

While not wishing to be bound by any particular theory or mechanism, the inventors believe that the deacylation treatment removes or cleaves at least some of the acetyl groups on the glucomannan polymer, resulting in a konjac that is very useful for preparing melt-controllable gels. As the degree of deacylation is increased, the gels made from such konjac tend to exhibit increased melting points, which is the basis for their being characterized as melt-controllable. Konjac that has been completely or substantially deacylated is useful in making heat stable aqueous gel systems that retain their integrity and do not melt at elevated temperatures generally encountered in food processing operations, e.g., baking, frying, retorting, sterilizing or the like.

The degree of deacylation for konjac treated under alkaline conditions is normally controlled through the selection of pH, reaction time and reaction temperature. The actual degree of deacylation is generally determined by measurement of the gel melting temperature of the alkali-treated konjac, for a given strength aqueous konjac gel. This procedure may be used to determine the appropriate pH (usually controlled by the weak base selection and its concentration), treatment time, and treatment temperature to obtain a konjac gel system with specific melt characteristics. As will be evident to one skilled in the art from the disclosures herein, there are many possible combinations of these parameters that may be employed in deacylating konjac to yield a (partially) deacylated konjac with specific melt temperature characteristics.

The deacylation of konjac is desirably carried out at an elevated temperature, preferably from about 50° C. to about 950° C. The pH should be mildly to moderately alkaline, with pH values above about 8 up to about 12 being preferred. More preferably, the pH during the deacylation reaction should be maintained below about 10. It has been found that treating konjac at a pH of about 8.7 at 80° C. for about ninety minutes will provide a konjac gel that is partially, at least about 30%, deacylated.

A preferred deacylation technique, useful for partially deacylating the konjac in the emulsions of this invention, particularly oil-in-water emulsions, involves introducing the weak base or weak alkali into the emulsion as a water-in-oil emulsion, i.e., the aqueous weak base or alkali being emulsified in a lipid phase. This latter lipid phase may be the lipid phase (lipid component and emulsifier component) used to make the emulsion of this invention. An advantage of this procedure is that a controlled rate of delivery of weak base or alkali is obtained into the konjac-containing aqueous phase of the emulsion, ensuring that the deacylation reaction occurs at a moderate, controlled rate and that uniform distribution of the weak base or alkali is achieved throughout the konjac-containing aqueous phase. More importantly, this procedure allows high shear mixing of the lipid phase and the konjac-containing aqueous phase to be carried out to form an emulsion, before the konjac gel has been substantially or completely formed as a result of deacylation partial or complete) of the konjac in the aqueous phase. This procedure therefore minimizes breakage of the konjac gel in the aqueous phase, which would otherwise occur during the high shear mixing that is needed from the lipid phase and konjac-containing aqueous phase.

In the emulsion compositions of the present invention, the partially deacylated konjac gel systems are preferred. By adjusting the degree of deacylation in the konjac, the melt characteristics of the emulsion system of this invention can be made to replicate the melt characteristics of the shortening or other fat that the emulsion replaces in bakery applications.

The selection or choice of the weak base or weak alkali is not critical, but food-grade materials should be used for emulsions intended for bakery or other food applications. Preferred weak bases are mildly to moderately alkaline materials, typically with a pH value of less than about 12, preferably less than about 10. Moderately strong bases or alkalis may also be used if sufficiently diluted, e.g., tetrasodium pyrophosphate (TSPP), calcium hydroxide, potassium carbonate, sodium hydroxide, sodium carbonate, sodium bicarbonate, potassium hydroxide and the like. Suitable weak bases may include salts of weak acids, such as sodium or potassium succinate, lactate, acetate, benzoate, citrate and the like. In systems where MCC or CMC are present, particularly oil-in-water emulsion systems, the use of divalent cations such as calcium is preferably avoided since such divalent cations can adversely affect the stabilization characteristics typically provided by MCC or CMC.

The weak bases described above are typically employed as 0.5–1% aqueous solutions, where partial deacylation of the konjac is the objective. For complete deacylation, a 2% solution of a moderately alkaline base such as TSPP is usually sufficient.

Another approach for obtaining controlled melt characteristics in the emulsion compositions of this invention is to increase the time the gel is exposed to high shear mixing conditions during its initial formation in the emulsion. Continued shearing of the konjac gel system interrupts the gel network or matrix as it is being formed, resulting in a fragmented or weaker gel that typically exhibits a lowered melt temperature.

The presence of the konjac in the emulsion compositions of this invention is largely responsible for the controlled melt characteristics of the emulsion. The aqueous phase of the emulsion may, however, contain other water soluble or water dispersible hydrocolloids or functional equivalents of hydrocolloids, e.g., microcrystalline cellulose, in combination with the konjac. Although konjac which has not been deacylated normally increases the viscosity of an aqueous medium but does not form a gel, the presence of one or more other hydrocolloids in addition to the konjac can provide satisfactory gelling characteristics for the system without the need to deacylate the konjac.

Preferred combinations in the aqueous phase of the emulsion compositions are konjac with one or more of the following other water soluble or water dispersible hydrocolloids or functional equivalents of hydrocolloids: xanthan, sodium alginate, locust bean gum, carrageenan, calcium alginate, potassium alginate, propylene glycol alginate, carboxymethylcellulose, methylcellulose, hydroxymethylcellulose, hydroxypropylmethylcellulose, guar gum, karaya gum, gum arabic, starch, pectin, inulin, maltodextrin, gelatin and the like. Highly preferred combinations are konjac with microcrystalline cellulose, konjac with xanthan gum, konjac with carrageenan, and konjac with starch. Blends of konjac with xanthan provide the highest gel strength when the respective weight ratio of konjac to xanthan is from about 20:80 to about 60:40. Blends of konjac with carrageenan also provide the highest gel strength when the respective weight ratio of konjac to carrageenan is from about 20:80 to about 60:40.

The microcrystalline cellulose (MCC) in konjac and MCC blends is preferably a microcrystalline cellulose coprocessed with carboxymethylcellulose, alginate, or guar. The term "coprocessed" as used in this specification refers to the physical processing of the named hydrocolloid with MCC in a manner that imparts improved physical characteristics or properties to the coprocessed MCC, not exhibited by MCC alone or by simple blends or mixtures of MCC with the hydrocolloid. Such coprocessing may be accomplished, for example, by the high shear mixing of the two components in an aqueous medium, followed by drying of the recovered coprocessed MCC.

The konjac in the emulsion composition is preferably present in an amount of from about 0.3 weight percent to about 5 weight percent, more preferably, from about 0.3 weight percent to about 2 weight percent, still more preferably, from about 0.5 weight percent to about 1.5 weight percent, based on the weight of the emulsion. In situations where the konjac is used in combination with one or more hydrocolloids or functional equivalents of a hydrocolloid, the konjac is generally the major component in the combination. The konjac and other optional hydrocolloids may be added to the aqueous phase of the emulsion, during preparation of the aqueous phase, either as a blend or separately. If added separately, the konjac is preferably introduced first to the aqueous phase and dispersed to ensure good hydration. The second or additional hydrocolloid components may then be added and dispersed in the konjac-containing aqueous medium or, alternatively, may be introduced as separate aqueous dispersions of these components to the konjac-containing aqueous medium.

The emulsions of this invention, in addition to the konjac-containing aqueous phase, also contain a lipid phase with one or more lipids and emulsifiers.

The lipid in the lipid phase may be any fat or oil, including hydrogenated or fractionated versions thereof and including combinations of these lipids. The lipid is desirably a food-grade or food-approved fat or oil, and such lipids include a wide variety of vegetable- or animal-derived lipids that are edible. The lipid may be a solid or semi-solid at ambient temperature, i.e., 20° C.–25° C. (such lipids are sometimes referred to as a fat, in contradistinction to an oil, which is generally a liquid at ambient temperature). The term "fat" is also used to refer generically to a lipid component of a food product, where the lipid may be either solid, semi-solid or liquid at ambient temperature (e.g., "a bakery product containing a specific level of 'fat'"). The term lipid is generally used in this specification to refer to all lipids, whether solid, semisolid, or liquid, except where the context clearly indicates otherwise.

Suitable lipids for use in the emulsion of this invention include vegetable fats and oils derived from safflower, canola (rapeseed), palm, sunflower, rice, cacao, olive and other plant-derived fats and oils, and include animal fats derived from tallow, lard, whale, fish and other animal-derived sources. Such lipids are typically characterized by having a triglyceride component, which is usually a major component of the lipid. Preferred lipids are those conventionally used in bakery food formulations, e.g., vegetable shortening, since the emulsion composition of this invention facilitates their use at reduced levels, as compared with the amounts used in the original or traditional bakery food product formulations or recipes.

The amount of lipid employed in the emulsion composition depends on the nature and amount of lipid that the emulsion is intended to replace in the bakery food product. An objective in the use of the emulsion compositions of this invention is to provide a reduced level of fat content in bakery food products, where not only a reduction in the fat content but also a reduction in the calorie content from fat may be sought in the reduced fat bakery food product. Consequently, the percentage of fat reduction being sought in the shortening or other lipid being replaced in a specific bakery food product should be factored into the determination of the lipid content in the emulsion composition. By way of example, if a 75 percent reduction in fat content is desired for a particular bakery product, then the emulsion of this invention should contain only 25 percent lipid, assuming that the emulsion will replace the original shortening on a one-to-one basis.

The amount of lipid component present in the emulsion composition is typically about 1 weight percent to about 30 weight percent, preferably about 5 weight percent to about 15 weight percent, all based on the weight of the emulsion.

The selection or choice of emulsifier or emulsifiers used in the lipid phase of the emulsion is generally based on the type of emulsion, i.e., oil-in-water or water-in-oil, as well as the identity and amount of lipids utilized. The emulsifiers are typically selected from conventional food-grade or food-approved emulsifiers. Many of the emulsifiers suitable for the emulsion compositions of this invention, particularly those which are oil-in-water emulsions (water continuous emulsions), are emulsions that are hydrophilic. The selection of the emulsifier is normally based on the affinity or solubilization characteristics of the emulsifier with respect to the continuous phase of the emulsion. Suitable emulsifiers include mono- and diglycerides of fatty acids, ethoxylated monoglycerides, polyglycerol fatty acid esters, sucrose fatty acid esters and polyesters, sorbitan fatty acid esters (e.g., stearate or oleate esters being preferred) and ethoxylated sorbitan fatty acid esters, and proteinaceous emulsifiers like lecithins (including fractionated or derivatized lecithins) and milk proteins. Those emulsifiers which contain fatty acids may be hydrogenated or partially hydrogenated, saturated or unsaturated, or fractionated (distilled).

Although a single emulsifier may be used in the emulsion composition, it has been found that combinations of two or more emulsifiers often provide enhanced benefit. Such emulsifier combinations serve not only to emulsify the lipid component in the lipid phase of the emulsion, but also to provide desired emulsifying characteristics in the bakery food product in which the emulsion is employed as a fat or oil substitute. The emulsifier selection may thus include an emulsifier or emulsifiers that are conventionally included in the bakery food product formulation or recipe. The individual emulsifiers or emulsifier combinations in the emulsifier component may be selected to provide satisfactory mouthfeel, tenderness and staling resistance in the bakery product, as well as to provide satisfactory dough strength and aeration characteristics in the bakery product.

Among emulsifier combinations, satisfactory results are often obtained with at least one emulsifier that is relatively lipophilic and at least one emulsifier that is relatively hydrophilic. Emulsifiers (and other surface active materials) may be characterized as hydrophilic or lipophilic using the well-known hydrophile-lipophile balance (HLB) value. A low HLB value, e.g., less than about 10, indicates lipophilic (or hydrophobic) characteristics, and a high HLB value, e.g., more than about 10, indicates hydrophilic characteristics for the surface active compound being evaluated. For commercially-available emulsifiers, the HLB value of the emulsifier is often included with the product specifications provided by the manufacturer.

The amount of emulsifier or emulsifiers employed depends on the amount of lipid present in the lipid phase, as well as on the amount of lipid phase relative to the aqueous phase in the emulsion composition. The emulsifier is generally employed in an emulsifying-effective amount, to ensure that the lipid phase may be successfully and stably emulsified with the konjac-containing aqueous phase. The emulsifier component is preferably present in the emulsion in an amount of about 1 weight percent to about 25 weight percent, more preferably about 3 weight percent to about 15 weight percent, based on the weight of the emulsion. As the amount of lipid in the emulsion formulation is decreased, the proportion of emulsifier component in the lipid phase is normally increased, to compensate in part for the reduced level of lipid in the emulsion and to ensure that a stable emulsion is formed.

The emulsions of this invention preferably have a ratio of aqueous phase to lipid phase within the range of about 1.5:1 to about 19:1 aqueous phase to lipid phase, more preferably, about 2:1 to about 10:1 aqueous phase to lipid phase, all based on weight.

The emulsion composition may be either an oil-in-water emulsion, sometimes designated as an O/W or water-continuous emulsion, or a water-in-oil emulsion, sometimes designated as a W/O or oil-continuous emulsion. Oil-in-water emulsions are preferred where the bakery food product formulation contains a relatively large amount of water, such as a batter for cakes or the like. The dispersed oil droplets in the water-continuous emulsion provide a large surface area for the relatively limited quantity of lipid phase present, and this ensures uniform distribution of the lipid component throughout the batter or dough to maximize the beneficial properties of the fat component in the formulation. The partially deacylated konjac is preferred for bakery food applications involving use of oil-in-water emulsions.

Water-in-oil emulsions, on the other hand, are preferred where fat crystallinity is important for providing a crisp texture, such as in flaky pastries like croissants and baklava. In water-in-oil emulsions, the aqueous phase is dispersed throughout the continuous oil phase, preferably as small gelled droplets, and the konjac may be either partially or completely deacylated. Since the internal phase, i.e., the konjac-containing aqueous phase, of a water-in-oil emulsion shortening replacement does not need to melt during the baking process, a completely deacylated konjac gel that is heat stable, i.e., a gel that does not melt at elevated temperature, is preferred for water-in-oil emulsions. Some bakery food applications are best served with such water-in-oil emulsions with completely acylated konjac, where the aqueous phase contains heat stable gelled droplets that do not melt at temperatures normally encountered during the baking process. This advantageously prevents release of the gel-bound water, the release of which could be detrimental to the textural properties of the resulting bakery food product.

The emulsion compositions of this invention are prepared in a relatively straightforward manner, regardless of whether the emulsion composition is to be an oil-in-water emulsion or a water-in-oil emulsion. The basic steps for preparing the emulsions are as follows. A lipid phase is formed by combining a lipid component with an emulsifier component; and an aqueous phase is formed by dispersing konjac in water. The liquid phase is then combined with the aqueous phase under high shear mixing conditions at an elevated temperature to form an emulsion. The emulsion composition thus formed is cooled below about 35° C. The formation of the emulsion is generally accomplished with high shear mixing devices or a homogenizer. This step is preferably carried out an elevated temperature, from about 50° C. to about 90° C.

The formation of the aqueous phase containing the konjac is preferably carried out at an elevated temperature, preferably above about 50° C., to promote dispersion, hydration and gel formation of the konjac, as well as any other hydrocolloids that may optionally be present. The formation of the lipid phase is generally and preferably carried out at an elevated temperature, preferably from about 40° C. to about 90° C., to promote melting of the fats employed as lipids and to promote good dispersion of the emulsifiers in the lipid component with the fats and/or oils in such lipid component.

Deacylation of the konjac is preferably carried out during the formation of the emulsion, by adjusting the pH of the konjac-containing phase to an alkaline pH value, preferably at a pH of about 8 to about 12, and more preferably less than about 10. The deacylation of the konjac is preferably carried out at a temperature of from about 50° C. to about 95° C. The deacylation reaction conditions are preferably controlled to provide a konjac gel in which the konjac is partially deacylated. One preferred procedure for obtaining good control of the deacylation reaction, to ensure only partial deacylation of the konjac by precise control of the pH, is through the introduction of a weak base, as a water-in-oil emulsion, to the konjac-containing emulsion prior to cooling of the konjac-containing emulsion-This approach is described in more detail in the Examples below.

The emulsion compositions of this invention are useful for preparing reduced fat bakery food products as well as essentially no fat bakery food products, as compared with the original or traditional high fat versions of such products.

The controlled melt characteristics of the emulsion contribute benefits to baked food products in which the emulsion composition is employed, in much the same manner as provided by the full fat shortening or other fat which the emulsion is intended to replace in part or completely. The emulsion compositions are typically of a plastic, semisolid or solid consistency below a temperature of about 35° C., but when heated to temperatures above about 60° C., the emulsion composition typically begins to flow or melt. The emulsions are also generally finely dispersed, with the internal phase containing droplets having an average diameter of from about 0.5 $\mu$m to about 20 $\mu$m, preferably from about 2 $\mu$m to about 5 $\mu$m.

As with shortenings, these emulsion compositions stabilize the foam (aeration) that occurs during baking of many baked food products, e.g., cakes. This foaming characteristic of shortening and other fats used in bakery products is largely responsible for the texture of the resultant baked food product. The inventor s have discovered, however, that the konjac-containing emulsions of this invention appear to be even more effective, on a weight/weight basis, than the shortening it can replace in stabilizing foam. This foam stability leads to a firm texture in a finished bakery product such as a cake and prevents unwanted consequences, such as the cake falling or failing to rise during the baking process.

The emulsion compositions of this invention are also highly effective at binding water, and this property is especially desirable in reduced fat, low fat or no fat bakery applications where increased water contents in the formulation are used to compensate for the lowered fat levels present. Fats (lipids) and emulsifiers normally present in full fat bakery food products prevent sogginess by binding water that is necessarily present in the formulation. The inventors have found that the konjac-containing emulsion compositions of this invention are able to bind water to an even greater extent than the fats and emulsifiers that they replace in baked food products. This feature of the emulsion compositions is extremely important since water typically is used to replace at least some of the fat and emulsifier in lowered fat bakery food formulations.

Use of the emulsion compositions of this invention avoids not only sogginess, but also gumminess in baked food products. Gumminess is an adverse textural characteristic that can accompany the use of large amounts of hydrocolloid gums, e.g., xanthan gum and guar gum, that are often added as fat replacers and water binding agents in prior art reduced fat baked food products. The emulsion compositions of this invention also provide lubricity in baked food products, and this property contributes to a firm bite mouth feel, along with desirable oiliness instead of sogginess in the baked food product.

A significant advantage of the emulsion compositions of this invention is that they can replace shortening and other conventional fats (lipids) in bakery food formulations on a one-to-one volume basis. Typical bakery food products may contain the emulsion compositions of this invention as a shortening substitute, in amounts of from about 5 weight percent to about 30 weight percent, based on the weight of the bakery product dough or batter prior to baking. This benefit permits the direct use of the emulsion compositions in the traditional bakery food formulations or recipes, without any modifications being required in the amounts of shortening or in the addition procedure originally called for. The emulsion compositions also provide similar viscosity characteristics in the batter or dough in which they are incorporated as shortening or butter (or other lipid) substitutes.

Still another benefit of the emulsion compositions described in this specification is that they may be readily prepared without the need for specialized equipment. This aspect permits the emulsion to be prepared in a commercial bakery, using conventional mixing equipment normally used in commercial bakery operations.

Use of the emulsion compositions of this invention to obtain reduced fat versions of traditional high fat bakery food products also has the desirable result of producing a reduced fat bakery food product with satisfactory taste and texture characteristics. The bakery products suitable for use with the emulsion compositions of this invention include cakes, pie crusts, Danish pastry, croissants, breads, doughnuts, cookies, snack cakes and the like.

All of these characteristics of the emulsion compositions are highly desirable since traditional bakery product formulations may continue to be used without modification, despite the introduction of a shortening substitute that can result in significant reductions in the fat content of the bakery food products.

The invention is illustrated further by the following nonlimiting Examples.

EXAMPLES

Example 1

Example 1 describes the preparation of a water-in-oil emulsion according to this invention, useful as a shortening replacement in pie crusts. The konjac-containing emulsion of this Example contains about 25 weight percent fat and is prepared by the following procedure.

A lipid phase is prepared by heating at 70° C., with stirring to promote melting, the following ingredients in a 600 mL (milliliter) beaker: 65 grams (g) Paramount® B hydrogenated palm kernel oil (Van den Bergh Co., Lisle, Ill.), 25 g Kaomel® partially hydrogenated soybean oil (Van den Bergh Co.), and the following emulsifier component 3 g Dimodan® OK distilled monoglyceride (Grindsted Products, Inc., Industrial Park, Kans.), 2 g Dimodan® CPK highly saturated, distilled monoglyceride (Grindsted Products, Inc.), and 5 g Ryoto® ER-290 sucrose monostearate (Mitsubishi-Kasei Food Co., Tokyo, Japan). A one-phase liquid lipid phase results.

An aqueous phase is prepared by dispersing 6 g konjac flour in 194 g distilled water, using a Silverson® mixer (Silverson Machines, Inc., Longmeadow, Massachusetts) at 4500 rpm for a period of one minute, and the aqueous phase is heated to 70° C. A weak base solution of 1 g tetrasodium pyrophosphate in 99 g distilled water is also prepared and is also heated to 70° C., for use as described below.

The aqueous phase containing the konjac is added slowly, at a rate of 50 mL/min, to the molten lipid phase, which is mixed at high shear, with a Lightnin® mixer (Lightnin, Rochester, N.Y.) at 3000 rpm, both phases being at a temperature of 70° C. Upon completion of addition of the aqueous phase, the water-in-oil emulsion that is formed is mixed at 3000 rpm for an additional three minutes.

At this point, the weak base solution is added with continued high shear mixing. After the addition of the weak base is complete, the emulsion is maintained at 70° C. for thirty minutes during which time it is slowly stirred. The emulsion is then allowed to cool to ambient temperature, about 20° C.–25° C. During this cooling period the emulsion is repeatedly and mildly sheared for a short period at intervals of two or three minutes until a plastic consistency is attained. The resulting emulsion is firm and plastic, melting between 55° C. and 70° C. Upon cooling, the emulsion regains its firm, plastic solid form and exhibits a consistency similar to lard.

This emulsion may be used to replace completely the solid shortening normally used in preparing pie crust; the fat content of the resultant pie crust is thereby reduced to 25 percent of the fat present in a pie crust prepared from common shortenings, for example, lard or Crisco® vegetable shortening.

Example 2

Example 2 describes the preparation of a water-in-oil emulsion according to this invention, useful as a shortening replacement in Danish pastry. The konjac-containing emulsion of this Example contains about 25 weight percent fat and is prepared by the following procedure.

A lipid phase is prepared by heating at 70° C., with stirring to promote melting, the following ingredients in a 600 mL beaker: 89 g butter oil (Level Valley Dairy), and the following emulsifier component: 7 g Dimodan® LSK distilled monoglyceride (Grindsted Products, Inc., Industrial Park, Kans.), 2 grams of Triodan® R90 polyglycerol polyricinoleate (Grindsted Products, Inc.), and 2 g Dimodan® CPK distilled highly saturated monoglyceride (Grindsted Products, Inc.). A one-phase liquid lipid phase results.

An aqueous phase is prepared by dispersing 8 g konjac flour in 192 g distilled water, using a Silverson® mixer at 4500 rpm for a period of one minute, and the aqueous phase is heated to 70° C. A weak base solution of 1 g tetrasodium pyrophosphate in 99 g distilled water is also prepared and is also heated to 70° C., for use as described below.

The aqueous phase containing the konjac is added slowly, at a rate of 50 mL/min, to the molten lipid phase, which is mixed at high shear, with a Lightnin® mixer at 3000 rpm, both phases being at a temperature of 70° C. Upon completion of addition of the aqueous phase, the water-in-oil emulsion that is formed is mixed at 3000 rpm for an additional three minutes.

At this point, the weak base solution is added with continued high shear mixing. After the addition of the weak base is complete, the emulsion is maintained at 70° C. for thirty minutes during which time it is slowly stirred. The emulsion is then allowed to cool to ambient temperature, about 20° C.–25° C. During this cooling period the emulsion is repeatedly and mildly sheared for a short period at intervals of two or three minutes until a plastic consistency is attained. The resulting emulsion is firm and plastic and exhibits a consistency similar to butter.

This emulsion may be used to replace completely the solid shortening normally used in preparing Danish pastry or croissants; the fat content of the resultant baked product is thereby reduced to 25 percent of the fat present in the same product prepared from common shortenings used in these products, e.g., butter. Use of this emulsion as a shortening replacement results in Danish pastry and croissants having the same flavor and mouthfeel as traditional versions of these products in which butter is the shortening.

Example 3

Example 3 describes the preparation of a oil-in-water emulsion according to this invention, useful as a shortening replacement in yellow cake. The konjac-containing emulsion of this Example is prepared by the following procedure. The oil-in-water emulsion is formed in two steps: first, preparation of a water-in-oil emulsion of the lipid phase and aqueous weak base solution; secondly, preparation of an oil-in-water emulsion by the addition of the first (water-in-oil) emulsion to the konjac-containing aqueous phase.

A lipid phase is prepared by heating at 70° C., with stirring to promote melting, the following ingredients in a 600 mL beaker: 50 g soybean oil (Wesson Company), 10 g Paramount® B hydrogenated palm kernel oil (Van den Bergh Co., Lisle, Ill.), and the following emulsifier component: 30 g Dimodan® OK distilled monoglyceride (Grindsted Products, Inc., Industrial Park, Kans.) and 10 g Tween® 80 polysorbate 80 (ICI Inc., Wilmington, Del.). A one-phase liquid lipid phase results.

A weak base solution of 1 g potassium citrate in 99 g distilled water is prepared and is also heated to 70° C. The weak base solution is then slowly added to the heated lipid phase, which is mixed at high shear, with a Lightnin® mixer at 3000 rpm. The water-in-oil emulsion that forms is stirred constantly and maintained at a temperature of 70° C. during the preparation of the konjac-containing aqueous phase.

An aqueous phase is prepared by dispersing 6 g konjac flour in 294 g distilled water, using a Silverson mixer at 4500 rpm for a period of one minute, and the aqueous phase is heated to 70° C.

The water-in-oil emulsion of the lipid phase and weak base is then introduced into the konjac-containing aqueous phase, and the multi-phase mixture is then mixed at high shear, with a Silverson® mixer at 4500 rpm for 45 seconds. Upon completion of this addition and mixing, the resulting oil-in-water emulsion is maintained at a temperature of 70° C. for thirty minutes. The emulsion is then allowed to cool to ambient temperature, about 20° C–25° C., overnight.

The resulting oil-in-water emulsion is very fine and is a viscous gel. At a temperature of 70° C., the emulsion does not flow, but the emulsion flows at 85° C. when placed on an incline. The emulsion is refrigerated until ready to be used to bake a yellow cake with only 25% of the fat content of a traditional yellow cake prepared with full-fat shortening, as described in Example 8.

Example 4

Example 4 describes the preparation of a oil-in-water emulsion according to this invention, useful as a shortening replacement in pound cake with firm but moist texture. The konjac-containing oil-in-water emulsion of this Example is prepared by the following procedure, which is similar to the two step approach described for Example 3.

A lipid phase is prepared by heating at 70° C., with stirring to promote melting, the following ingredients in a 600 mL beaker: 40 g Paramount® B hydrogenated palm kernel oil (Van den Bergh Co., Lisle, Ill.), 25 g Kaomel® partially hydrogenated soybean oil (Van den Bergh Co.), and the following emulsifier component: 10 g Lipodan® highly saturated, distilled monoglyceride (Grindsted Products, Inc., Industrial Park, Kans.), 10 g Dimodan® OK distilled monoglyceride (Grindsted Products, Inc.), 5 g Dimodan® LSK distilled monoglyceride safflower ester (Grindsted Products, Inc.) and 10 g Tween® 80 polysorbate 80 (ICI Inc., Wilmington, Del.). A one-phase liquid lipid phase results.

A weak base solution of 1 g potassium citrate in 99 g distilled water is prepared and is also heated to 70° C. The weak base solution is then slowly added to the heated lipid phase, which is mixed at high shear, with a Lightnin® mixer at 3000 rpm. The water-in-oil emulsion that forms is stirred constantly and maintained at a temperature of 70° C. during the preparation of the konjac-containing aqueous phase.

An aqueous phase is prepared by dispersing 4 g konjac flour in 196 g distilled water, using a Silverson® mixer at 4500 rpm for a period of one minute, and the aqueous phase is heated to 70° C.

The water-in-oil emulsion of the lipid phase and weak base is then introduced into the konjac-containing aqueous phase, and the multi-phase mixture is then mixed at high shear, with a Silverson® mixer at 4500 rpm for 45 seconds. Upon completion of this addition and mixing, the resulting oil-in-water emulsion is maintained at a temperature of 70° C. for thirty minutes. The emulsion is then allowed to cool to ambient temperature, about 20° C.–25° C., overnight.

The resulting oil-in-water emulsion is smooth and plastic. At a temperature of 85° C., the emulsion flows slowly down a sheet of glass inclined at an angle of 45°. The emulsion is refrigerated until ready to be used to bake a cake.

A pound cake baked with this emulsion composition contains only 25% of the fat content of a traditional pound cake prepared with full-fat shortening. The resulting pound cake is characterized as having high volume, fine and firm texture, and possessing a moist and creamy mouthfeel upon mastication. The reduced fat pound cake may be described as being comparable in eating characteristics to a traditional full fat pound cake.

Example 5

Example 5 describes the preparation of a oil-in-water emulsion according to this invention, useful as a shortening replacement in yellow cake. The konjac-containing emulsion of this Example contains only about 10 weight percent fat and is prepared by the following procedure, which is similar to the two step approach described for Examples 3 and 4.

A lipid phase is prepared by heating at 70° C., with stirring to promote melting, the following ingredients in a 600 mL beaker: 25 g Crisco® vegetable shortening (Procter & Gamble Company, Cincinnati, Ohio) and the following emulsifier component: 20 g Dimodan® OK distilled monoglyceride (Grindsted Products, Inc., Industrial Park, Kans.), 10 g Tween® 80 polysorbate 80 (ICI Inc., Wilmington, Del.), 2 g Triodan® R90 polyglycerol polyricinoleate (Grindsted Products, Inc.) and 2 g lecithin A one-phase liquid lipid phase results.

A weak base solution of 0.5 g tetrasodium pyrophosphate in 99.5 g distilled water is prepared and is also heated to 70° C. The weak base solution is then slowly added to the heated lipid phase, which is mixed at high shear, with a Lightnin® mixer at 3000 rpm. The water-in-oil emulsion that forms is stirred constantly and maintained at a temperature of 70° C. during the preparation of the konjac-containing aqueous phase.

An aqueous phase is prepared by dispersing 10 g of a blend of konjac and xanthan, in a weight ratio of about 35:65 konjac to xanthan, in 490 g distilled water, using a Silverson mixer at 4500 rpm for a period of one minute, and the aqueous phase is heated to 70° C.

The water-in-oil emulsion of the lipid phase and weak base is then introduced into the konjac-containing aqueous phase, and the multi-phase mixture is then mixed at high shear, with a Silverson® mixer at 4500 rpm for 45 seconds. Upon completion of this addition and mixing, the resulting oil-in-water emulsion is maintained at a temperature of 70° C. for thirty minutes. The emulsion is then allowed to cool to ambient temperature, about 20° C.–25° C., over a twenty-four hour period.

The resulting oil-in-water emulsion is a firm, elastic gel, which stretches easily to form a film. When heated to a temperature above 70° C., the emulsion flows. The emulsion is refrigerated until ready to be used to bake a cake.

A pound cake may be baked with this emulsion composition, the emulsion being substituted for the full-fat shortening on a one-to-one basis, and contains only about 10% of the fat content of a traditional full-at pound cake. The resulting pound cake is characterized as having comparable volume to that of a traditional full-fat pound cake; the bite of the reduced fat cake was less firm than that of traditional full-fat pound cake.

Example 6

Example 6 describes the preparation of a oil-in-water emulsion according to this invention, useful as a shortening replacement in bread where dough strengthening agents are desired. The konjac-containing emulsion of this Example 6 is prepared by the following procedure, which is different from the procedure used in the previous three Examples. The konjac in this emulsion composition is also used with another hydrocolloid, xanthan gum.

A lipid phase is prepared by heating at 70° C., with stirring to promote melting, the following ingredients in a 600 mL beaker: 50 g soybean oil and the following emulsifier component: 40 g Dimul® mono- and diglycerides (Witco Corporation, Greenwich, Conn.), 10 g Myverol® succinylated monoglycerides (Eastman Chemical Co., Kingsport, Tenn.), 5 g Epicuron® high phosphatidyl choline lecithin (Lucas Meyer, Inc., Decatur, Ill.). A one-phase liquid lipid phase results.

A water-in-oil emulsion is next prepared with a weak base solution, as follows. A weak base solution of 1 g tetrasodium pyrophosphate in 99 g distilled water is prepared and is heated to 50° C. A lipid phase is prepared by mixing 49 g soybean oil and 1 g Admul® WOL emulsifier (Quest International, Zwijndrecht, Netherlands), and this is also heated to 50° C. The weak base solution is then added to the lipid phase, which is mixed at high shear, with a Lightnin® mixer at 3000 rpm. The water-in-oil emulsion that forms is maintained at a temperature of 50° C. during the preparation of the konjac-containing aqueous phase.

An aqueous phase is prepared by dispersing 5 g of a blend of konjac and xanthan, in a weight ratio of about 35:65 konjac to xanthan, in 344 g distilled water, using a Silverson® mixer at 4500 rpm for a period of one minute, and the aqueous phase is heated to 70° C.

The lipid phase is then introduced into the konjac-containing aqueous phase, and the multi-phase mixture is then mixed at high shear, with a Silverson® mixer at 4500 rpm for 45 seconds. Upon completion of this addition and mixing, the water-in-oil emulsion containing the weak base is also introduced into the oil-in-water emulsion with high shear mixing, using a Silverson® mixer at 4500 rpm for a period of one minute.

The resulting oil-in-water emulsion is maintained at a temperature of 70° C. for twenty minutes. The emulsion is then allowed to cool to ambient temperature, about 20° C.–25° C., over a twenty-four hour period.

The resulting oil-in-water emulsion may be used to replace the shortening in bread dough formulations, where the fat content is thereby reduced by more than 80%. The emulsion composition, as noted above, contains an alloy of konjac and xanthan, and this combination of hydrocolloids contributes to dough strength. The emulsion composition also results in finer, more efficient dispersion of the emulsifiers, lecithin and succinylated monoglycerides, in the dough.

Example 7

Example 7 describes the preparation of a water-in-oil emulsion according to this invention, useful as a shortening replacement in cakes. The konjac-containing emulsion of this Example is an all liquid (pourable) shortening replacement, containing predominantly unsaturated fats, and is prepared by the following procedure.

A lipid phase is prepared by heating at 70° C., with stirring to promote melting, the following ingredients in a 600 mL beaker: 97.5 g canola oil and the following emulsifier component: 2.5g Triodan® R90 polyglycerol polyricinoleate (Grindsted Products, Inc., Industrial Park, Kans.). A one-phase liquid lipid phase results.

An aqueous phase is prepared by dispersing 4 g konjac flour in 196 g distilled water, using a Silverson r mixer at 4500 rpm for a period of one minute, and the aqueous phase is heated to 70° C. A weak base solution of 2 g tetrasodium pyrophosphate in 98 g distilled water is also prepared and is also heated to 70° C., for use as described below.

The aqueous phase containing the konjac is added slowly, at a rate of 50 mL/min, to the lipid phase, which is mixed at high shear, with a Lightnin® mixer at 3000 rpm, both phases being at a temperature of 70° C. Upon completion of addition of the aqueous phase, the water-in-oil emulsion that is formed is mixed at 3000 rpm for an additional three minutes.

At this point, the weak base solution is added with continued high shear mixing. After the addition of the weak base is complete, the emulsion is maintained at 70° C. for thirty minutes during which time it is slowly stirred. The emulsion is then allowed to cool to ambient temperature, about 20° C.–25° C. During this cooling period the emulsion is repeatedly and mildly sheared for a short period at intervals of two or three minutes until a plastic consistency is attained.

The resulting emulsion is pourable, a result of the presence of micron-sized gel particles suspended in the liquid oil phase. The konjac in the gel particles is substantially completely deacylated, so the gel particles are heat stable and bind the water even when the emulsion is processed in a bakery product at elevated temperatures. Emulsion compositions such as described in this Example are useful where a predominantly liquid unsaturated fat is to be used in place of a saturated fat in a bakery food product formulation.

The emulsion composition is desirably used in cake formulations in combination with another hydrocolloid gum, such as a konjac/xanthan alloy which is a good film-former, and the hydrocolloid gum should be incorporated with the dry cake ingredients. A cake prepared in this manner with the pourable emulsion composition will possess high lubricity and other sensory characteristics of a full-fat cake, despite having only 25 percent of the fat content of a full-fat cake.

Example 8

This Example 8 describes five different emulsion compositions of this invention and their use in a standard yellow layer cake formulation. Four of the emulsions (8A, 8B, 8C and 8E) are oil-in-water emulsions prepared as described in Example 3, and one emulsion (8D) is a water-in-oil emulsion prepared as described in Example 7. Four of the emulsion compositions (8A, 8B, 8C and 8D) are used to replace full-fat shortening in a yellow cake formulation containing 25% fat content, so that the resultant reduced fat yellow cakes contain just 6.25% fat content, only 25% of the fat in the original full-fat cake formulation. One emulsion composition (8E) has half the fat content of the other four emulsions, so that the resultant reduced fat yellow cake contains only about 3% fat content.

The standard yellow layer cake, "a full-fat cake" containing 25 percent fat, is prepared using the following standard recipe developed by the American Institute of Baking, Manhattan, Kansas. The amounts shown produce 1000 grams of batter and are proportionately reduced from the amounts provided by the American Institute of Baking which result in 1630 grams of batter. The recipe follows:

| Weight (grams) | Ingredient |
| --- | --- |
| 245 | Cake flour |
| 295 | Granulated sugar |
| 24.5 | Whole egg solids |
| 18.4 | Non-fat dry milk |
| 7.4 | Salt |
| 15.3 | Baking powder (Fleishmann) |
| 12.3 | Aqueous emulsifier blend (Kake Mate 21 special cake emulsifier (Mallet & Co.)) |
| 61.3 | Shortening, Hi-Ratio |
| 153.4 | Water (part 1 of 3) |
| 1.2 | Flavoring, BLV (C.F. #2182) |
| 0.6 | Liquid egg color (3% solution of #8038 Egg Shade (Warner Jenkinson)) |
| 73.6 | Water (part 2 of 3) |
| 92.0 | Water (part 3 of 3) |

The procedure begins with blending the dry ingredients for one minute at low speed in a 4.7 L (5 quart) bowl using a Hobart N-50 mixer equipped with a paddle. The liquid ingredients, including 153.4 grams of water (part 1 of 3) are added and incorporated into the dry mixture. Next, the shortening is added and broken up to facilitate mixing. The batter is mixed first for one minute at low speed and then three minutes at medium speed. The second part of water, 73.6 grams, is added and bowl scraped before mixing for one minute at low speed and then two minutes at medium speed. The final part of water, 92.0 grams, is added and the bowl again is scraped before a final two minute mixing period at low speed. The batter is placed in two 20.32 cm (8 inch) round cake pans, 400 grams in each pan, and the cake is baked for 25 minutes at 190.5° C. (375° F.). Upon completion of baking, the cakes are placed on a wire rack to cool to ambient temperature before being evaluated by measuring height, both at the center of the cake and at opposite edges, and examining the cake's physical characteristics externally and internally. The organoleptic properties of the cake are also evaluated by experienced personnel.

The measured heights of a cake baked according to this procedure are 4.5 cm at the center and 3.7 cm at the edges. The dimensions of its crumb structure is 0.5–1 mm, and the air cells measure 0.5–0.8 mm in diameter. The cake provides a high level of lubricity and gives a smooth, clean bite.

The five emulsion compositions of this invention evaluated in this Example 8 are summarized in Table 1 below, which specifies the ingredients employed in preparing each emulsion, the preparation method, emulsion type, percentage deacylation of the konjac, and percentage fat in the emulsion.

TABLE 1

| Formulation Ingredients | 8A | 8B | 8C | 8D | 8E |
| --- | --- | --- | --- | --- | --- |
|  | Weight (grams) | | | | |
| Konjac: | | | | | |
| konjac flour[a] | 6 | 6 | 4 | 3 | |
| konjac/xanthan blend[b] | | | | | 6 |
| Emulsifiers: | | | | | |
| Dimodan ® OK[c] | 30 | 30 | 10 | | |
| Myverol ® P06[d] | 5 | 5 | | | |
| Triodan ® R90[e] | 2 | 2 | | 1.5 | |
| Lipodan ®[f] | | | 10 | | |
| Dimodan ® LSK[g] | | | 5 | | 25 |
| Tween ® 60[h] | | | 10 | | |
| Sugar ester 290[i] | | | | 1 | |
| Soya lecithin[j] | | | | 3 | |
| Tween ® 80[k] | | | | | 10 |
| Lipids: | | | | | |
| Soybean oil | 30 | 30 | | 94.5 | |
| Crisco ®[l] | 33 | 33 | 40 | | 15 |
| Krystal Gold ®[m] | | | 25 | | |
| Weak bases: | | | | | |
| Potassium citrate | 2 | | 4 | | |
| Tetrasodium pyrophosphate | | 10 | | 1 | |
| Sodium acetate | | | | | 2 |
| Water | 290 | 284 | 292 | 296 | 342 |
| Preparation Example | 3 | 3 | 3 | 7 | 3 |
| Type of emulsion | O/W | O/W | O/W | W/O | O/W |
| Percent deacylated | ~30 | 100 | ~60 | 100 | ~75 |
| Percent fat in emulsion | 25 | 25 | 25 | 25 | 12.5 |

[a]konjac flour
[b]konjac flour blended with xanthan gum in a respective weight ratio of 35:65
[c]Dimodan ® OK distilled monoglycerides from Grindsted Products, Inc.
[d]Myverol ® P-06, distilled propylene glycol monoesters from Eastman Chemical Co.
[e]Triodan ® R-90, polyglycerol polyricinoleate from Grindsted Products Inc.
[f]Lipodan ® CREK, a highly saturated, distilled monoglyceride from Grindsted Products, Inc.
[g]Tween ® 60, polyethoxylated (20) sorbitan monostearate from ICI Surfactants
[h]Ryoto ® ER290, sucrose monostearate from Mitsubishi-Kasei Food Co.
[i]Hawkeye ® soya lecithin from Quality Ingredients Corp.
[j]Tween ® 80 polysorbate 80 from ICI Surfactants
[k]Soybean oil from Wesson Co.
[l]Crisco ® brand shortening from Procter and Gamble
[m]Krystal Gold ® partially hydrogenated vegetable oil from Van Den Bergh Co.

Emulsion 8A is described as having a plastic consistency which begins to flow down a slanting surface at about 80° C. Emulsion 8B is described as being a firm gel which does not melt upon heating. Emulsion 8C is a firm plastic solid at 20° C.–25° C. but flows when heated to 70° C.; it solidifies rapidly upon cooling. Emulsion 8D is pourable at room temperature. Emulsion 8E is described as being a firm gel similar to emulsion 8B, but, unlike emulsion 8B, it melts at approximately 70° C.

Yellow cakes are baked using the emulsions designated 8A to 8E as shortening substitutes; slightly modified recipes are used to compensate for the increased water introduced with the emulsions. All of the materials in the yellow layer cake formulations, including the emulsions which replace the shortening, are identified above in this Example 8. The emulsions replace both the emulsifiers and the shortening shown in the standard recipe for the full-fat yellow layer cake. The standard recipe is modified to account for the water introduced in the fat-containing emulsions, usually by increasing the amounts of flour and granulated sugar amounts. Cakes 8A to 8D each have 25 percent of the fat content of the full-fat standard yellow layer cake (which contains 25% fat), and cake 8E reduces the fat to 12.5 percent of a full-fat cake. The recipe ingredients used for cakes 8A to 8E are summarized in Table 2:

TABLE 2

| Cake Example Ingredients | 8A | 8B | 8C | 8D | 8E |
|---|---|---|---|---|---|
| | Weight (grams) | | | | |
| Cake Flour | 265 | 265 | 265 | 265 | 265 |
| Granulated sugar | 316 | 316 | 316 | 316 | 316 |
| Whole egg solids | 24 | 24 | 24 | 24 | 24 |
| Non-fat dry milk solids | 18.4 | 18.4 | 18.4 | 18.4 | 18.4 |
| Salt | 7.4 | 7.4 | 7.4 | 7.4 | 7.4 |
| Baking powder | 15.3 | 15.3 | 15.3 | 15.3 | 15.3 |
| Water (part 1 of 3) | 125 | 125 | 125 | 125 | 125 |
| Flavoring | 1.2 | 1.2 | 1.2 | 1.2 | 1.2 |
| Liquid Egg Color | 0.6 | 0.6 | 0.6 | 0.6 | 0.6 |
| Water (part 2 of 3) | 38 | 38 | 38 | 38 | 38 |
| Water (part 3 of 3) | 80 | 80 | 80 | 80 | 80 |
| Emulsion | 120 | 120 | 120 | 120 | 120 |
| Emulsion Example No. | 8A | 8B | 8C | 8D | 8E |
| Cake properties | | | | | |
| Center height (cm) | 5.2 | 4.2 | 4.8 | 4.9 | 4.7 |
| Edge height (cm) | 3.0 | 2.3 | 3.4 | 3.3 | 3.6 |
| Cell size (mm) | 0.4–0.5 | 0.5–1.0 | 0.5–0.7 | 0.5–0.7 | 0.5–0.7 |

Cake 8A contains the same amount of fat as cake 9A (see Comparative Example 9 below), but it has superior mouth-feel and lubricity and is firmer, giving a clean bite. The finished batter prior to baking is viscous with a density of 0.88 g/cc. Cake 8B has a coarser crumb structure and is dryer than cake 10A. Cake 8C is characterized as being firmer that cake 8A, but this is to be anticipated because its higher solid fat content Cake 8C has greater lubricity than cake 9A and a firmer bite than cakes 8A and 8B. Cake 8D has a clean bite and lacks gumminess. It is as moist as cake 8A and is comparable in eating quality to cake 8A. Cake 8E has a fine texture and a superior bite. It is less gummy than cake 9B, and is dryer than the full-fat yellow layer cake of this Example 8.

Comparative Example 9

This Example describes reduced fat and no fat yellow layer cakes based on the standard recipe shown in Example 8 but using a prior art xanthan gum system to compensate for the reduced fat. The standard recipe described in Example 8 is modified by adjusting the dry ingredients to make a cake (9A) having 25 percent of the shortening in the standard recipe and a cake (9B) having no shortening at all. In addition to the modification in the dry ingredients, xanthan gum, a common ingredient in commercial cakes, is added to bind the water that would otherwise be expected to produce a soggy cake. These cakes are prepared for comparison of their properties with those described in Example 8. The ingredients in the adjusted recipes are summarized in Table 3, which also contains the standard full-fat cake recipe described in Example 8. Table 3 also notes some of the physical characteristics of the cakes.

TABLE 3

| | Comparative 9A | Comparative 9B | Standard Cake (Example 8) |
|---|---|---|---|
| | | Weight (grams) | |
| Cake Ingredients | | | |
| Cake flour | 265 | 277 | 245 |
| Granulated sugar | 316 | 327 | 295 |
| Whole egg solids | 24.5 | 24.5 | 24.5 |
| Non-fat dry milk | 18.4 | 18.4 | 18.4 |
| Salt | 7.4 | 7.4 | 7.4 |
| Baking powder (Fleishmann) | 15.3 | 15.3 | 15.3 |
| Aqueous emulsifier blend | 4.1 | | 12.3 |
| Shortening Hi-Ratio | 15.3 | | 61.3 |
| Water (part 1 of 3) | 153.4 | 153.4 | 153.4 |
| Flavoring | 1.2 | 1.2 | 1.2 |
| Liquid egg color | 0.6 | 0.6 | 0.6 |
| Water (part 2 of 3) | 73.6 | 73.6 | 73.6 |
| Water (part 3 of 3) | 92 | 92 | 92 |
| Xanthan gum | 4 | 4 | 0 |
| Cake properties | | | |
| Fat content | 6.25 | 0 | 25 |
| Center height (cm) | 3.7 | 3.9 | 4.5 |
| Edge height (cm) | 3.3 | 3.4 | 3.7 |
| Cell size (mm) | 2–3 | large | 0.5–0.8 |

Cake 9A, which has only 25 percent by weight of the fat compared with the standard cake of Example 8, has a coarse crumb structure with large, uneven voids that are created by moisture channeling. This cake is overly moist and dense and is judged to be barely acceptable. Cake 9B is dense, moist, soggy, and gummy with unusually large air cells and is judged to be totally unacceptable.

What is claimed is:

1. A composition, useful as a shortening substitute in bakery applications, which comprises a gel formed from an emulsion with an aqueous phase containing water and konjac as a gelling agent; and a lipid phase containing a lipid component and an emulsifier component, wherein the konjac is from about 30% deacylated to 100% deacylated and is present in an amount of from about 0.3 weight percent to about 2 weight percent, based on the weight of the emulsion.

2. A composition of claim 1 wherein the konjac is present in an amount of from about 0.5 weight percent to about 1.5 weight percent, based on the weight of the emulsion.

3. A composition of claim 1 wherein the konjac is employed in combination with a hydrocolloid or hydrocolloid functional equivalent.

4. A composition of claim 3 wherein the hydrocolloid or hydrocolloid functional equivalent is selected from the group consisting of microcrystalline cellulose, xanthan, sodium alginate, locust bean gum, carrageenan, calcium alginate, potassium alginate, propylene glycol alginate, carboxymethylcellulose, methylcellulose, hydroxymethylcellulose, hydroxypropylmethyl cellulose, guar gum, karaya gum, gum arabic, starch, pectin, inulin, maltodextrin and gelatin.

5. A composition of claim 1 wherein the lipid component is selected from the group consisting of vegetable fats, vegetable oils, animal fats, animal oils and mixtures thereof.

6. A composition of claim 1 wherein the lipid component is present in an amount of from about 1 weight percent to about 30 weight percent, based on the weight of the emulsion.

7. A composition of claim 1 wherein the emulsifier component is a combination of emulsifiers.

8. A composition of claim 7 wherein at least one emulsifier has a hydrophile-lipophile balance value of less than about 10 and at least one other emulsifier has a hydrophile-lipophile balance value of greater than about 10.

9. A composition of claim 1 wherein the emulsifier component is present in the emulsion in an amount of from about 1 weight percent to about 25 weight, based on the weight of the emulsion.

10. A composition of claim 9 wherein the emulsifier component is selected from the group consisting of mono- and diglycerides of fatty acids, ethoxylated monoglycerides, polyglycerol fatty acid esters, sucrose fatty acid esters, sucrose fatty acid esters esters, sucrose fatty acid esters polyesters, sorbitan fatty acid esters, ethoxylated sorbitan fatty acid esters, and proteinaceous emulsifiers.

11. A composition of claim 1 wherein the internal phase of the emulsion consists of droplets having an average diameter of from about 0.5 $\mu$m to about 20 $\mu$m.

12. A bakery product containing a shortening substitute having a composition which comprises a gel formed from an emulsion with an aqueous phase containing water and konjac as a gelling agent; and a lipid phase containing a lipid component and an emulsifier component, wherein the konjac is from about 30% deacylated to 100% deacylated and is present in an amount of from about 0.3 weight percent to about 2 weight percent, based on the weight of the emulsion.

13. A bakery product of claim 12 wherein the emulsion composition is present in an amount of from about 5 weight percent to about 30 weight percent, based on the weight of the bakery product prior to baking.

14. A bakery product of claim 12 wherein the konjac is present in an amount of from about 0.5 weight percent to about 1.5 weight percent, based on the weight of the emulsion composition.

15. A bakery product of claim 12 wherein the konjac is employed in combination with a hydrocolloid or hydrocolloid functional equivalent.

16. A bakery product of claim 15 wherein the hydrocolloid or hydrocolloid functional equivalent is selected from the group consisting of microcrystalline cellulose, xanthan, sodium alginate, locust bean gum, carrageenan, calcium alginate, potassium alginate, propylene glycol alginate, carboxymethylcellulose, methylcellulose, hydroxymethylcellulose, hydroxypropylmethyl cellulose, guar gum, karaya gum, gum arabic, starch, pectin, inulin, maltodextrin and gelatin.

17. A bakery product of claim 12 wherein the lipid is selected from the group consisting of vegetable fats, vegetable oils, animal fats, animal oils and mixtures thereof.

18. A bakery product of claim 12 wherein the lipid component is present in an amount of from about 1 weight percent to about 30 weight percent, based on the weight of the emulsion.

19. A bakery product of claim 12 wherein the emulsifier component is a combination of emulsifiers.

20. A bakery product of claim 19 wherein at least one emulsifier has a hydrophile-lipophile balance value of less than about 10 and at least one other emulsifier has a hydrophile-lipophile balance value of greater than about 10.

21. A bakery product of claim 12 wherein the emulsifier component is present in the emulsion in an amount of from about 1 weight percent to about 25 weight percent, based on the weight of the emulsion.

22. A bakery product of claim 21 wherein the emulsifier component is selected from the group consisting of mono- and diglycerides of fatty acids, ethoxylated monoglycerides, polyglycerol fatty acid esters, sucrose fatty acid esters, sucrose fatty acid esters esters, sucrose fatty acid esters polyesters, sorbitan fatty acid esters, ethoxylated sorbitan fatty acid esters, and proteinaceous emulsifiers.

23. A process for preparing an emulsion composition useful as a shortening substitute in baking applications which comprises:

forming a lipid phase by combining a lipid component with an emulsifier component;

forming an aqueous phase by dispersing konjac in water; and combining the lipid phase with the aqueous phase under shear mixing conditions at a temperature effective to form an emulsion wherein the konjac is present in an amount of from about 0.3 weight percent to about 2 weight percent, based on the weight of the emulsion; and cooling the emulsion composition below about 35° C. to provide a gel wherein the konjac is from about 30% deacylated to 100% deacylated.

24. A process of claim 23 wherein the konjac is present in an amount of from about 0.5 weight percent to about 1.5 weight percent, based on the weight of the emulsion.

25. A process of claim 23 wherein the konjac is dispersed in the aqueous phase at a temperature of above about 50° C.

26. A process of claim 23 wherein the konjac is deacylated under alkaline pH conditions, at a pH of about 8 to about 12.

27. A process of claim 23 wherein the konjac is deacylated at a temperature of from about 50° C. to about 95° C.

28. A process of claim 23 wherein a weak base is introduced, as a water-in-oil emulsion, to the konjac-containing emulsion prior to cooling of the konjac-containing emulsion.

29. A process of claim 23 wherein the lipid phase is heated during its formation step to a temperature of from about 40° C. to about 90° C.

30. A process of claim 23 wherein the lipid is selected from the group consisting of vegetable fats, vegetable oils, animal fats, animal oils and mixtures thereof.

31. A process of claim 23 wherein the lipid is present in the emulsion composition in an amount of from about 1 weight percent to about 30 weight percent, based on the weight of the emulsion.

32. A process of claim 23 wherein the emulsifier component is a combination of emulsifiers.

33. A process of claim 32 wherein at least one emulsifier has a hydrophile-lipophile balance value of less than about 10 and at least one other emulsifier has a hydrophile-lipophile balance value of greater tan about 10.

34. A process of claim 23 wherein the emulsifier component is present in the emulsion composition in an amount of from about 1 weight percent to about 25 weight percent, based on the weight of the emulsion.

35. A process of claim 34 wherein the emulsifier component is selected from the group consisting of mono-and diglycerides of fatty acids, ethoxylated monoglycerides, polyglycerol fatty acid esters, sucrose fatty acid esters, sucrose fatty acid polyesters, sorbitan fatty acid esters, ethoxylated sorbitan fatty acid esters, and proteinaceous emulsifiers.

36. A process of claim 23 wherein the konjac is employed in combination with a hydrocolloid or hydrocolloid functional equivalent.

37. A process of claim 36 wherein the hydrocolloid or hydrocolloid functional equivalent is selected from the group consisting of microcrystalline cellulose, xanthan, sodium alginate, locust bean gum, carrageenan, calcium alginate, potassium alginate, propylene glycol alginate, carboxymethylcellulose, methylcellulose, hydroxymethylcellulose, hydroxypropylmethyl cellulose, guar gum, karaya gum, gum arabic, starch, pectin, inulin, maltodextrin and gelatin.

38. A process of claim 23 wherein the lipid phase and aqueous phase are combined to form the emulsion at a temperature of from about 50° C. to about 90° C.

39. A process of claim 23 wherein the internal phase of the emulsion composition consists of droplets having an average diameter of from about 0.5 μm to about 20 μm.

40. A process of claim 23 wherein the deacylated konjac provides the emulsion composition with a melting point or flowing point above a temperature of about 60° C.

* * * * *